United States Patent [19]

Bernoteit et al.

[11] 4,262,769

[45] Apr. 21, 1981

[54] UNIVERSAL COMMAND SIGNAL PRODUCING MEANS

[75] Inventors: Kenneth G. Bernoteit, Hanover Park, Ill.; Robert F. Bourke, Kamiah, Id.

[73] Assignee: Gould Inc., Rolling Meadows, Ill.

[21] Appl. No.: 943,635

[22] Filed: Sep. 19, 1978

[51] Int. Cl.³ ............................................. B60K 26/02
[52] U.S. Cl. .................................. 180/323; 74/480 R; 74/513; 74/30; 180/65 R; 303/3
[58] Field of Search ............... 180/65 R, 323; 303/3; 74/512, 513, 30, 479, 480 R

[56] References Cited

U.S. PATENT DOCUMENTS

| | | | |
|---|---|---|---|
| 464,245 | 12/1891 | Dewey | 180/65 R |
| 1,469,258 | 10/1923 | Geistert | 74/512 |
| 2,379,774 | 7/1945 | Wyer | 74/512 |
| 2,589,975 | 3/1952 | Sprinkel | 74/479 |
| 2,821,861 | 2/1958 | Dunn | 74/30 |
| 3,089,499 | 5/1963 | Way | 74/30 |
| 3,171,505 | 3/1965 | Imelmann | 180/65 R |
| 3,621,929 | 11/1971 | Offenbach-Rumpenheim | 303/3 |
| 3,726,029 | 4/1973 | Deen | 74/30 |
| 3,943,795 | 3/1976 | Kenney | 74/479 |
| 4,002,373 | 1/1977 | Mori | 303/3 |
| 4,067,426 | 1/1978 | Murphy | 74/512 |

Primary Examiner—John P. Silverstrim

Attorney, Agent, or Firm—Wegner, Stellman, McCord, Wiles & Wood

[57] ABSTRACT

A universal command signal producing apparatus adapted for use in an electrically operated vehicle. The apparatus includes a rotatable electrical element for use in controlling a drive function of the vehicle, such as a speed control function or a braking function. The apparatus is arranged to act as a transducer between a foot pedal, adapted to be actuated by the user of the vehicle, and the propulsion control to selectively control the electric drive motor of the vehicle or the braking system thereof. The transducer apparatus may include a sprocket associated with the rotatable electrical control device and driven by a chain forming a part of the transducer. The chain may be mounted on a suitable carrier which is adapted to be moved by movement of the foot pedal. The transducer may include a rotatable transverse shaft actuated by the foot pedal and arranged so as to have the foot pedal selectively installed at either end of the shaft so that the vehicle may selectively be operated as either a left- or righthand drive vehicle. When used as a brake control, the transducer may be operated hydraulically whereby the system provides concurrent hydraulic and regenerative braking of the vehicle.

10 Claims, 8 Drawing Figures

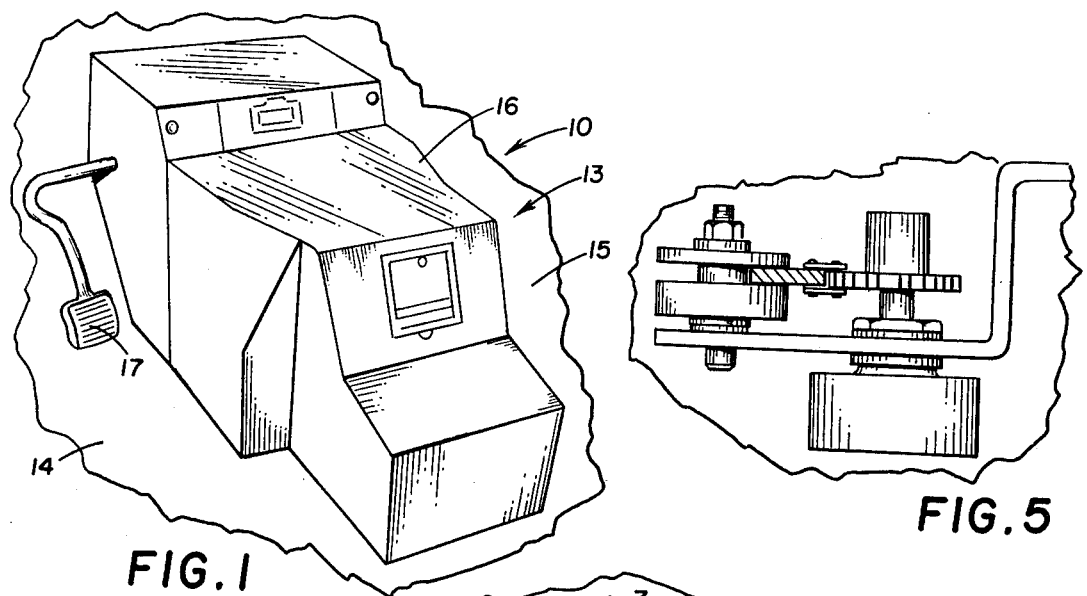
FIG. 1
FIG. 5
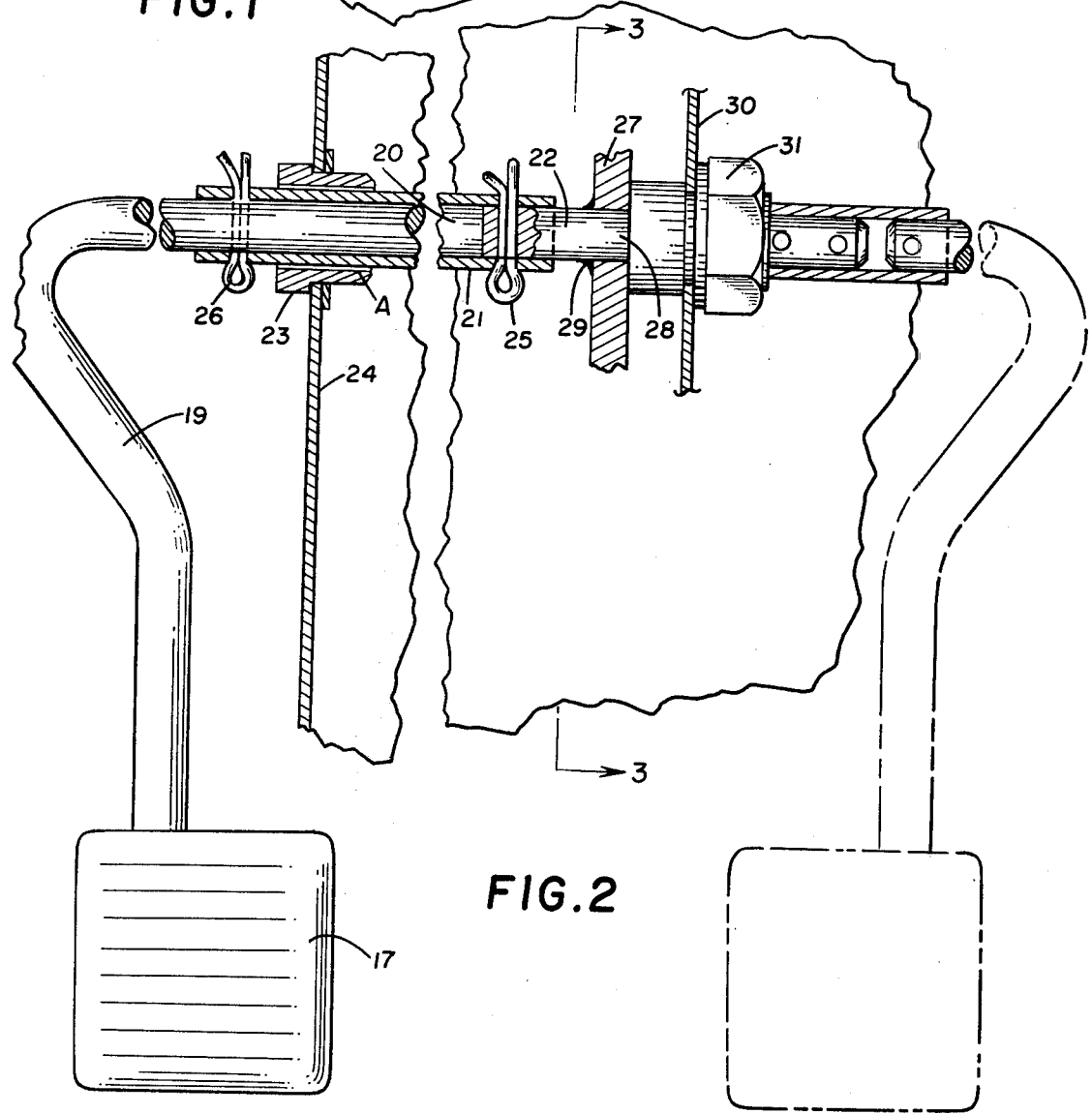
FIG. 2

UNIVERSAL COMMAND SIGNAL PRODUCING MEANS

BACKGROUND OF THE INVENTION

1. Field of the Invention

This invention relates to electrically operable vehicles and in particular to means for controlling the acceleration and braking of the vehicle.

2. Description of the Prior Art

In U.S. Letters Pat. No. 4,008,423 of Clinton C. Christianson et al, which patent is owned by the assignee hereof, an improved electrically propelled vehicle is disclosed having a direct current drive motor operated from a propulsion battery of the vehicle. The vehicle is adapted to be operated both at low speed and high speed by different modes of operation of the motor.

Robert F. Bourke, in U.S. Letters Pat. No. 3,938,020, which patent is owned by the assignee hereof, discloses a charger circuit for an accessory battery in such an electrically propelled vehicle.

In U.S. Letters Pat. No. 3,946,299, owned by the assignee hereof, Clinton C. Christianson et al disclose a battery state of charge gauge including an improved circuit for detecting and indicating the actual state of charge of the storage battery of the vehicle.

Clinton C. Christianson et al, in U.S. Letters Pat. No. 3,958,173, which patent is owned by the assignee hereof, disclose a power converter employing non-saturating interphase transformer means for providing an output voltage having a level controlled in response to an external control signal.

It is further conventional in vehicles to utilize hydraulic brakes for braking the movement of the vehicle. Such brakes are conventionally energized by operation of a foot pedal by the operator of the vehicle available in an operator's space portion of the vehicle. Further, it is conventional in vehicles to provide an accelerator foot pedal which is connected to the propulsion motor by suitable transducer means for controlling the speed and driving power of the vehicle. In electrically operated vehicles, the speed and power of the motor may be controlled by a potentiometer having a rotatable control shaft.

SUMMARY OF THE INVENTION

The present invention comprehends an improved universal command signal producing means for use in controlling the driving and braking operations of an electrically operable vehicle.

More specifically, the invention comprehends an improved transducer apparatus which is adapted to control a potentiometer as an incident of movement of a foot pedal by the operator in controlling operation of the vehicle. The transducer apparatus may include a sprocket for rotating the potentiometer shaft and a chain engageable with the sprocket for effecting rotation thereof as an incident of movement of the foot pedal.

The transducer apparatus may include a pair of arms, one of which is pivotally mounted as to the frame of the vehicle. The second arm is pivotally mounted to the first arm and is arranged to carry the chain. A guide, which may be in the form of a roller, is provided for guiding the second arm adjacent the sprocket to maintain meshed association between the chain and sprocket in all positions of the arms.

The first arm may be swung about its pivot axis by means connecting the same to the foot pedal. In one form, the connecting means comprises mechanical connecting means directly interconnecting the foot pedal to the first arm. In another form, the interconnecting means may comprise hydraulic means including a hydraulic piston. In the illustrated embodiment, the hydraulic piston is operated concurrently with the operation of the hydraulic brakes of the vehicle, utilizing the hydraulic fluid pressure generated by the actuation of the brake pedal by the vehicle operator.

Where the apparatus is utilized as a braking control, the braking of the vehicle may be effected jointly by the hydraulic braking action and a regenerative braking action of the direct current drive motor. The transducer may be provided with suitable biasing springs so as to provide a preselected correlation between the hydraulic braking action and the regenerative braking action.

Thus, the universal command signal producing means of the present invention is extremely simple and economical of construction while yet providing the highly desirable features and improved vehicular functioning as discussed above.

BRIEF DESCRIPTION OF THE DRAWING

Other features and advantages of the invention will be apparent from the following description taken in connection with the accompanying drawing wherein:

FIG. 1 is a perspective view of a portion of the operator's space of an electrically operable vehicle illustrating the mounting of an accelerator pedal relative to a console portion thereof;

FIG. 2 is a fragmentary enlarged vertical section illustrating the selective mounting of the pedal at either the left or right side of the operator's space and at opposite sides of the console;

FIG. 5 is a fragmentary vertical section illustrating the meshed association of the chain and sprocket means;

DESCRIPTION OF THE PREFERRED EMBODIMENT

Figure 3:
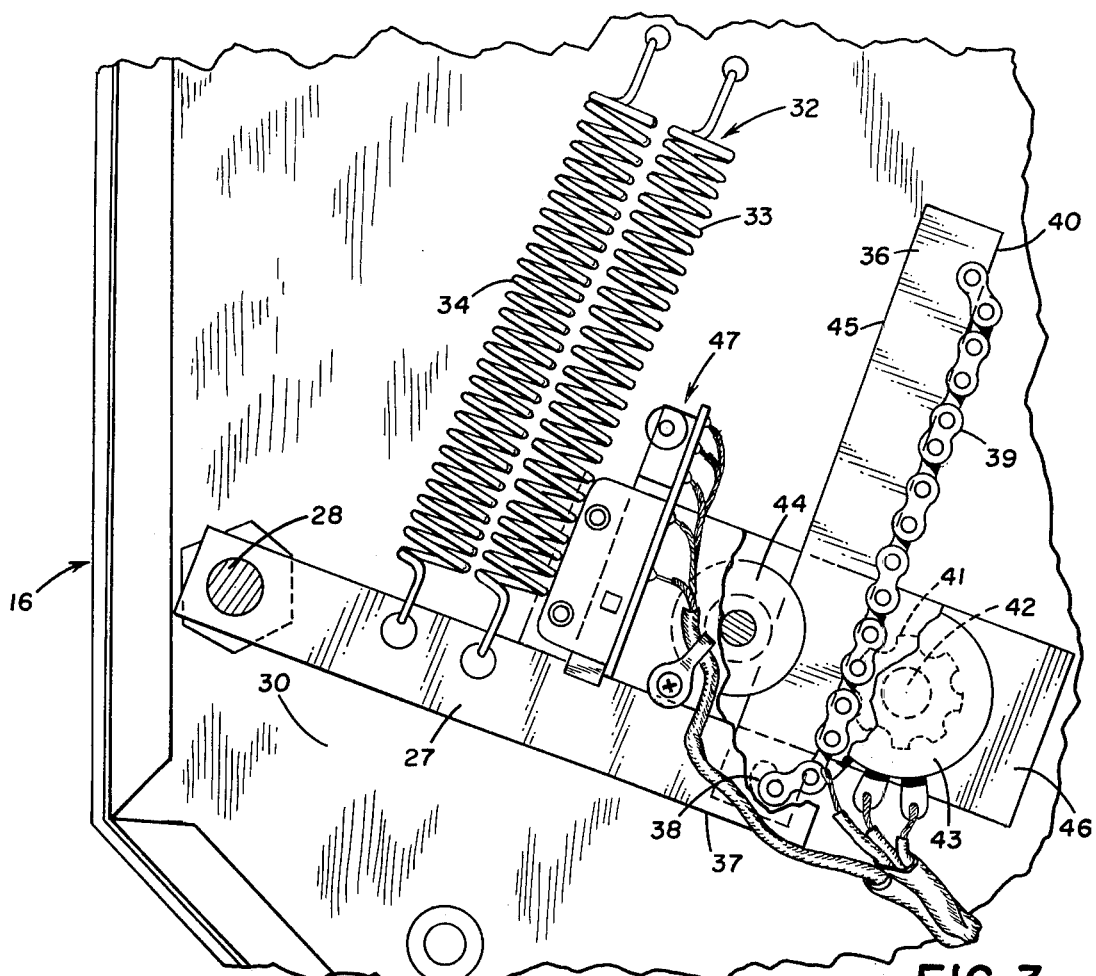
FIG. 3 is a fragmentary vertical section longitudinally of the console illustrating the interconnecting means for rotating the rotatable electrical control element.

In the exemplary embodiment of the invention as disclosed in the drawing, an electrically operated vehicle apparatus generally designated 10 is provided with conventional propulsion wheels 11 which may be driven by a direct current drive motor 12. The vehicle may include means defining an operator's space 13 in which the operator of the vehicle may be disposed in the normal operation of the vehicle. The operator's space may be divided into opposite side portions, including left side portion 14 and right side portion 15, by a central console 16.

Figure 6:
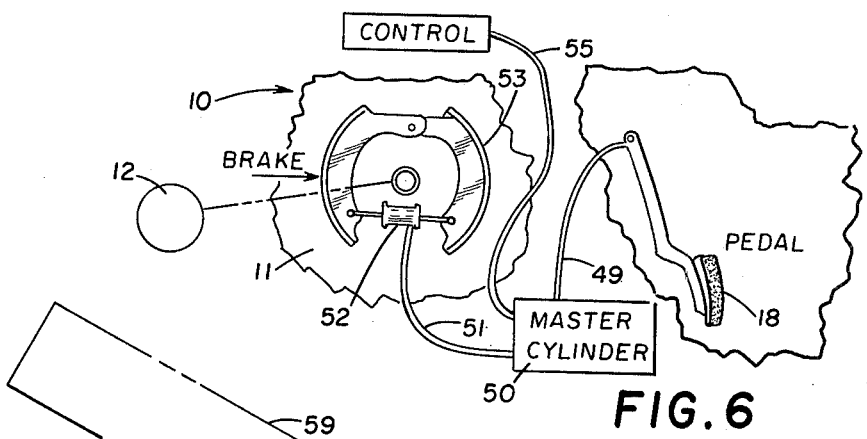
FIG. 6 is a fragmentary schematic illustrating the arrangement of the hydraulic braking system in combination with the control means of the present invention.

Driving of the vehicle may be controlled by an accelerator pedal 17 and a brake pedal 18, as seen in FIGS. 1 and 6, respectively. In the illustrated embodiment, the brake and foot pedals may be disposed selectively in either the left or right side portions of the operator's space as desired so as to provide the vehicle as either a left- or righthand drive vehicle.

More specifically, as seen in FIG. 2, the accelerator pedal 17 may be mounted to a rod 19 having an end portion 20 received in a tubular connector 21 of a transverse shaft 22 mounted for rotation about its longitudinal axis by suitable journals 23 carried by the wall 24 of console 16. Rod end 20 may be rotatively and axially fixed to the shaft 22 by suitable means, such as cotter pins 25 and 26.

As shown in FIG. 2, the foot pedal may be selectively mounted to either end of the shaft 22 by the tubular connecting means.

A control lever arm 27 may be fixed to the midportion 28 of shaft 22 as by welding 29 for pivotal movement about the longitudinal axis A of the shaft as an incident of movement of the foot pedal 17. Midportion 28 of the shaft may be rotatably carried in a support wall 30 of the console and retained against axial displacement by suitable nut means 31.

Figure 4:
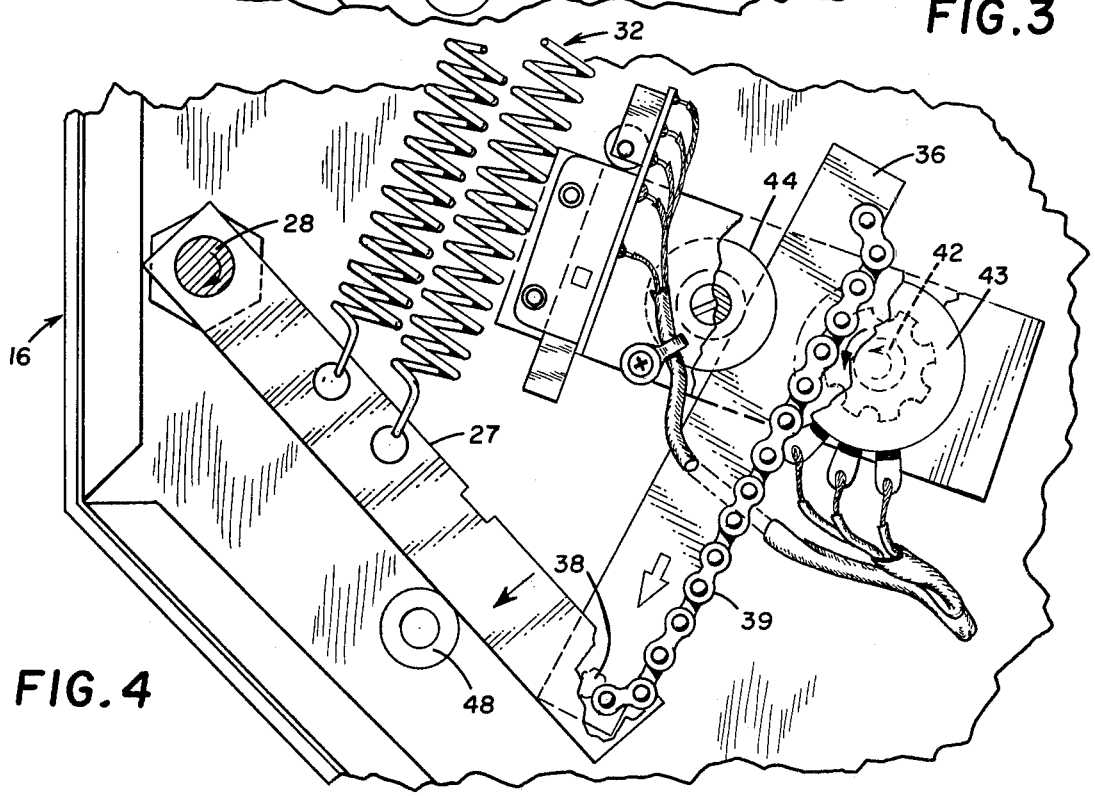
FIG. 4 is a fragmentary vertical section generally similar to that of FIG. 3, but illustrating the arrangement of the parts as upon depression of the foot pedal.

Referring now to FIGS. 3 and 4, lever arm 27 is biased in a counterclockwise direction, as seen therein, by spring means generally designated 32 illustratively comprising a pair of springs 33 and 34 connected between the arm 27 and support wall 30 of the console. Thus, the spring means 32 biases the foot pedal 17 through shaft 28 to an uppermost position, as seen in FIG. 1.

A second lever arm 36 is pivotally connected to the distal end 37 of the first lever arm 27 by a suitable pivot 38 so as to have generally rectilinear movement as a result of the pivotal movement of the arm 27 about axis A of shaft 28. Arm 36 carries a chain 39 which extends generally longitudinally of the arm along one edge 40 thereof. Chain 39 is maintained in meshed association with a sprocket 41 carried on the shaft 42 of a rotary electrical control element 43 illustratively comprising a potentiometer, by means of a guide roller 44 engaging the opposite edge 45 of the arm 36. Resultingly, the generally rectilinear movement of arm 36 caused by the pivotal movement of arm 27 causes a corresponding rotation of the potentiometer shaft 42 in general correspondence to the movement of the foot pedal 17 by the vehicle operator.

As further seen in FIGS. 3 and 4, the potentiometer 43 may be mounted to a bracket 46 so as to be disposed adjacent the arm 36 for enmeshed engagement of the chain 39 with the sprocket 41. Guide roller 44 may be mounted to the bracket 46 to provide accurate relationship between the potentiometer and the guide bracket and thereby effective maintenance of the desired free driving relationship between chain 39 and sprocket 41. It has been found that the utilization of the chain 39 and sprocket 41 in controlling the rotative position of the potentiometer shaft provides a highly improved free-floating means for adjusting the potentiometer accurately while yet being low cost in minimizing machining accuracy in the manufacture of the control.

As further seen in FIGS. 3 and 4, additional electrical control circuitry means, such as control apparatus 47, may be mounted on the bracket as desired.

As seen in FIGS. 3 and 4, the clockwise movement of the lever arm 27 is limited by abutment thereof with the bracket 46. The counterclockwise movement of the lever arm 27 may be limited by abutment with a stop 48 carried on the console 16 whereby the meshed association of chain 39 with the sprocket 41 is maintained between the limits shown in FIGS. 3 and 4, respectively.

Potentiometer 43 may be utilized in the motor control circuit of the vehicle in the normal manner. Thus, as is well known to those skilled in the art, such potentiometer control means may be utilized to control the current flow from the vehicle battery to the vehicle drive motor whereby operation of the foot pedal 17 by the operator provides a corresponding propulsion or drive of the vehicle by the drive motor through the wheels 11.

The present invention is further illustrated in connection with the braking of the vehicle in FIGS. 6–8. As shown in FIG. 6, the brake pedal 18 may be connected through suitable linkage 49 to a conventional hydraulic master cylinder 50 which provides hydraulic pressure as a function of the force applied to the brake pedal. The hydraulic pressure may be delivered through a suitable brake line 51 to the brake cylinder 52 for applying braking force to the brakes 53 associated with the drive wheels 11. This operation of the braking system is well known to those skilled in the art.

The present invention, however, comprehends the use of the pressure developed by the master cylinder 50 for adjusting a rotary electrical control element 74 which may comprise a potentiometer controlling the regenerative braking of the wheels 11 through the drive motor 12 in the conventional regenerative braking manner. For this purpose, a linear hydraulic motor 54 is connected to the master cylinder 50 by a suitable line 55. The piston 56 of device 54 is provided with an actuator 57 engaging a notched portion 58 of a control lever arm 59 pivotally mounted to a bracket 76 on a pivot 60. The control lever arm 59 is biased against the actuator 57 by spring means 61 including a pair of springs 62 and 63 connected between the arm 59 and bracket 76, as seen in FIG. 7.

A second control lever arm 64 is pivotally mounted to the distal end of arm 59 by suitable pivot 65 and carries a chain 66 adapted to mesh with a sprocket 67 fixed to the shaft 68 of the potentiometer 74. The chain is maintained in meshed association with sprocket 67 by a guide roller 69 engaging the edge 70 of the arm 64, as seen in FIG. 7.

Figure 7:
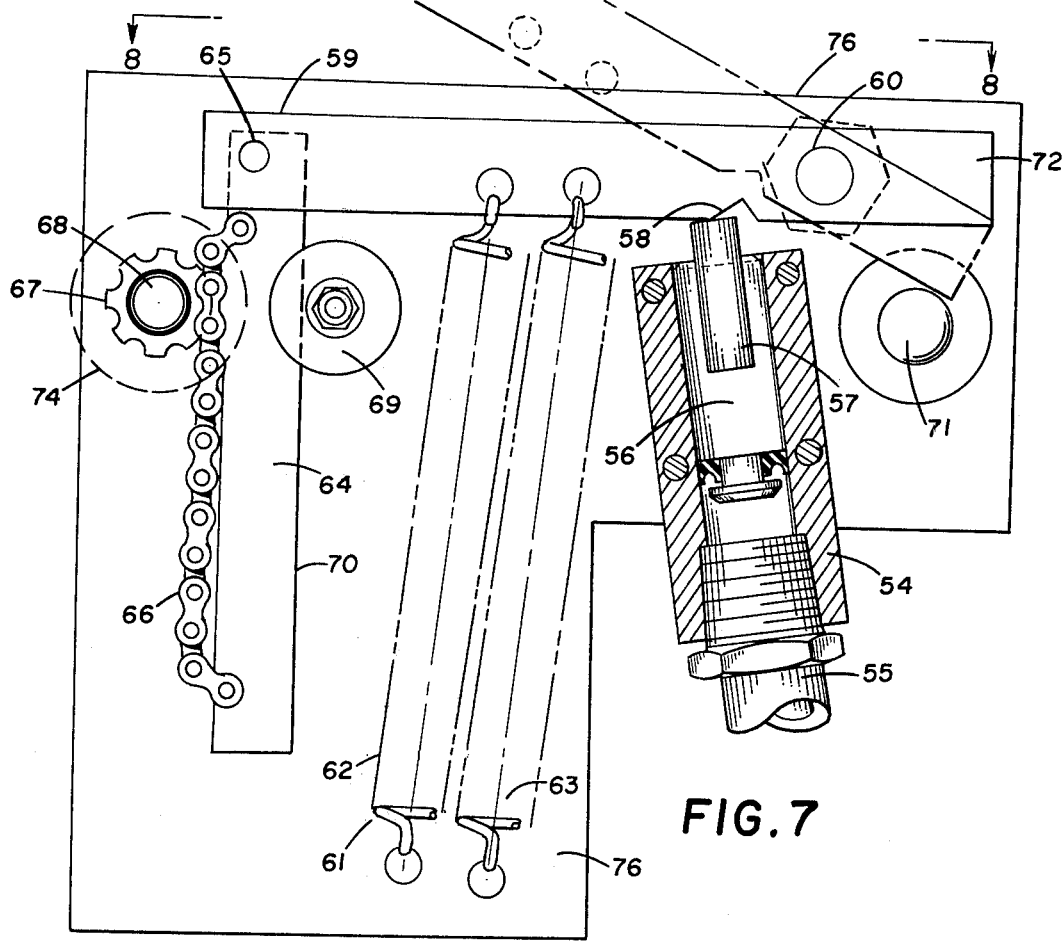
FIG. 7 is a fragmentary enlarged vertical section illustrating the interconnecting means utilized in the hydraulic braking system.

As shown in broken lines in FIG. 7, the maximum clockwise pivoting of arm 59 is limited by a stop 71 disposed in the path of movement of the end 72 of the arm 59.

Figure 8:
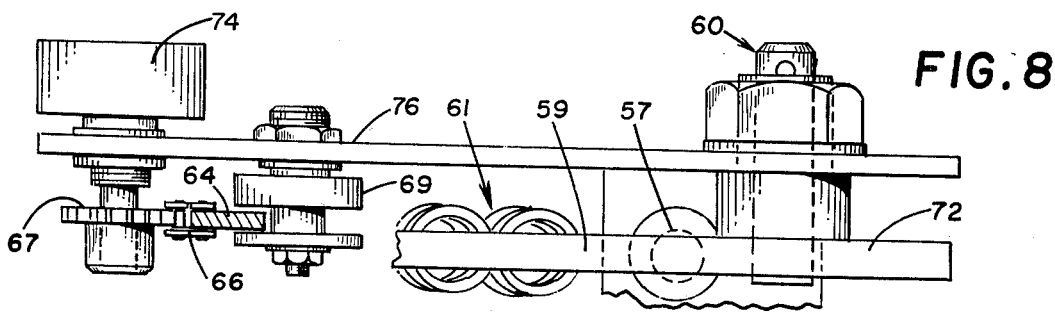
FIG. 8 is a fragmentary horizontal section taken substantially along the line 8—8 of FIG. 7.

Thus, the braking system illustrated in FIGS. 6–8 provides an improved braking operation in the electrically driven vehicle by combining the regenerative braking action controlled by potentiometer 74 with the hydraulic braking action applied through the brake 53. The spring means 61 and piston 56 may be preselected so as to provide a correlated permissible movement of the chain 66 under the forceful urging of the hydraulic motor 54 to correlate the amount of regenerative braking with the hydraulic braking force. In the illustrated embodiment, the effective braking provided by the hydraulic operation of brakes 53 occurs when the hydraulic fluid pressure is approximately 150 p.s.i. gauge. Thus, the regenerative braking produced by the adjustment of potentiometer 74 may be applied to the wheels 11 prior to the effective braking thereof by the hydraulic braking means. The proportioning of the regenerative braking and hydraulic braking forces may be controlled so as to provide a smooth, positive braking of the vehicle with minimum effort by the operator. The use of the pressure transducer 54 accurately relates the amount of regenerative braking desired to the amount of hydraulic braking being effected by the vehicle operation so as to provide an improved overall braking effort.

As the control of the braking function is through the medium of the linkage 49 connected to the braking pedal 18, disposition of the braking pedal in either of the left or right side portions of the operator space is readily permitted.

As disclosed above, in each of the driving and braking applications of the improved transducer apparatus, the transducer mechanism is effectively defined by a pair of pivotally connected arms, one of which is pivotally mounted and caused to swing in correspondence with the movement of a foot pedal control of the vehicle. The second arm is provided with a chain which engages a sprocket associated with the rotary control element intended to be adjustably positioned in correspondence with the foot pedal movement so as to provide an improved, free-floating, accurate control of the rotary adjustment. The apparatus effectively defines a universal command signal producing means affording a similar high accuracy in the driving and braking functions of electrically operable vehicles.

The foregoing disclosure of specific embodiments is illustrative of the broad inventive concepts comprehended by the invention.

I claim:

1. In an electrically driven wheeled vehicle apparatus having an electrical propulsion means including a drive motor connected to drive wheels of the vehicle, hydraulically operable brakes for braking the vehicle wheels, a foot pedal, and hydraulic means responsive to operation of the foot pedal for producing hydraulic pressure to operate the brakes, the improvement comprising a control for causing braking of the wheels by the drive motor operating in a regenerative mode upon initial operation of the brake pedal causing the hydraulic means to produce a low hydraulic pressure insufficient to operate the hydraulically operable brakes and causing effective braking of the wheels by said hydraulic means only after the pressure produced by said hydraulic means reaches a preselected high operating hydraulic pressure, said control including a rotatably adjustable electrical element for controlling the regenerative braking current when the drive motor is caused to operate in the regenerative mode, and means for adjusting the electrical element as a function of the positioning of the foot pedal including sprocket means connected to the electrical element for rotation thereof, a pivotally mounted carrier having a first arm pivotally movable about a first pivot axis as a function of movement of the foot pedal, and a second arm having a portion pivotally connected to a portion of the first arm defining a second pivot axis arcuately movable about said first axis, a chain carried by said second arm to be meshed with said sprocket for rotating the electrical element as an incident of movement of the chain as a result of the arcuate movement of said second arm portion connected to said first arm portion, and means acting radially of said sprocket against said second arm for effectively maintaining positive meshed engagement of the chain with said sprocket in all positions of the movement of said second arm.

2. The electrically operated vehicle structure of claim 1 wherein said electrical element comprises a potentiometer.

3. The electrically driven wheeled vehicle apparatus of claim 1 wherein said control means includes means for biasing said electrical element to a nonbraking disposition.

4. The electrically driven wheeled vehicle apparatus of claim 1 wherein said control means includes means for spring biasing said electrical device to a nonbraking disposition.

5. The electrically driven wheeled vehicle apparatus of claim 1 further including means defining an operator's space having left and right side portions, said means for adjusting the electrical element including a shaft, means for mounting the shaft to extend transversely of the vehicle at the operator's space for rotation about its longitudinal axis, and means connecting said foot pedal selectively to either end of the shaft for rotation of the shaft by an operator selectively in the corresponding either one of said operator space side portions.

6. The electrically operated vehicle of claim 5 wherein said vehicle includes a console at the center of the operator's space and said shaft is rotatably journaled therein.

7. The electrically operated vehicle of claim 5 wherein said shaft includes tubular connectors at the opposite ends thereof and said foot pedal includes a cylindrical portion removably secured in the selected shaft end tubular connector.

8. The potentiometer adjusting means of claim 1 wherein the last named means comprises a roller rotatably engaging the second arm.

9. The potentiometer adjusting means of claim 1 wherein said drive means extends generally rectilinearly.

10. The potentiometer adjusting means of claim 1 wherein said arm is elongated and said chain extends lengthwise thereof.

* * * * *